United States Patent [19]

Gebo

[11] Patent Number: 5,130,920
[45] Date of Patent: Jul. 14, 1992

[54] ADAPTIVE PROCESS CONTROL SYSTEM, ESPECIALLY FOR CONTROL OF TEMPERATURE OF FLOWING FLUIDS

[75] Inventor: Charles H. Gebo, Rochester, N.Y.

[73] Assignee: Eastman Kodak Company, Rochester, N.Y.

[21] Appl. No.: 408,016

[22] Filed: Sep. 15, 1989

[51] Int. Cl.$^5$ .................. G05B 13/00; G06F 15/46; H05B 6/68
[52] U.S. Cl. .................. 364/151; 364/165
[58] Field of Search .............. 364/165, 151, 150, 149, 364/148, 164

[56] References Cited

U.S. PATENT DOCUMENTS

| | | | |
|---|---|---|---|
| 3,449,215 | 6/1969 | Johnson et al. | 364/165 |
| 3,567,395 | 3/1971 | Paz . | |
| 3,601,588 | 5/1966 | Bristol | 364/151 |
| 3,657,524 | 4/1972 | Bakke | 364/149 |
| 3,758,762 | 9/1973 | Littman et al. | 364/149 |
| 3,816,689 | 6/1974 | Long | 219/10.55 |
| 3,976,179 | 8/1976 | Harrison et al. . | |
| 4,006,346 | 2/1977 | Pemberton | 364/165 |
| 4,152,567 | 5/1979 | Mayfield | 219/10.55 A |
| 4,257,105 | 3/1981 | Stewart et al. | 364/149 |
| 4,290,986 | 9/1981 | Koschmann . | |
| 4,310,739 | 1/1982 | Hatem | 219/10.55 A |
| 4,358,652 | 11/1982 | Kaarup | 219/10.55 A |
| 4,367,354 | 1/1983 | Dibiano . | |
| 4,417,116 | 11/1983 | Black | 219/10.55 A |
| 4,543,245 | 9/1985 | Peterman et al. . | |
| 4,578,747 | 3/1986 | Hideg et al. | 364/165 |
| 4,698,745 | 10/1987 | Hiroi et al. | 364/149 |
| 4,776,301 | 10/1988 | Dziubakowski . | |
| 4,918,584 | 4/1990 | Goff | 364/165 |
| 4,922,412 | 5/1990 | Lane et al. | 364/157 |
| 4,969,084 | 11/1990 | Smith | 364/165 |
| 4,978,425 | 12/1990 | Beller et al. | 364/471 |
| 5,025,810 | 6/1991 | Kikuchi et al. | 128/804 |

OTHER PUBLICATIONS

"Adaptive Filtering-Prediction & Control", G. C. Goodwin & K. S. Sin (1984), pp. 178-181.

Primary Examiner—Jerry Smith
Assistant Examiner—Patrick D. Muir
Attorney, Agent, or Firm—M. Lukacher; F. Boos

[57] ABSTRACT

A control system (method and apparatus) is adaptive on-line with changing process conditions, for example, the specific heat of a liquid used in a process. The system regulates a variable of a process (temperature of the liquid used in the process) and has a fast dynamic response to handle temperature transients while adapting to changing process conditions. The system uses feedforward and feedback control loops, which in the case of the process involving the temperature control of a liquid are respectively responsive to the temperature of the liquid before and after a control point. The system exercises adaptive control of the feedforward control function from the feedback loop. The system is preferably implemented with a digital computer. The fast dynamic response is enhanced by applying microwave energy from a microwave generator to heat the liquid at the control point with the feedforward and feedback control loops controlling the microwave generator.

26 Claims, 7 Drawing Sheets

ADAPTIVE PROCESS CONTROL SYSTEM, ESPECIALLY FOR CONTROL OF TEMPERATURE OF FLOWING FLUIDS

DESCRIPTION

The present invention relates to process control systems, and more particularly to a control system (method and apparatus) which is adaptive on-line to changing process conditions.

The invention is especially suitable for use in a process where the temperature of a flowing liquid requires regulation with a fast dynamic response to handle temperature transients while adapting to changing process conditions such as the specific heat of the flowing liquid or other conditions affecting the temperature of the liquid. The process may be part of the process of coating of photographic paper or film which requires precise temperature regulation. The invention is applicable generally wherever a variable of a process is to be controlled, whether that variable be temperature or some other physical or chemical process variable; temperature control of flowing fluids as described herein being an illustrative and presently preferred embodiment of the invention.

In regulating the temperature of flowing fluids, the conventional approach has been to use heat exchangers. Heat exchangers as are available are inadequate in providing the dynamic response for fast and precise regulation of the temperature of the fluid, for example, within a few seconds. In addition, heat exchangers generally are large in size, do not heat uniformly and must be maintained by cleaning and purging in order to keep them operative and avoid product contamination. Conventional control systems using heat exchangers for temperature control of flowing fluids have been inadequate for providing precise regulation while at the same time adapting (preferably in real time and on-line) to changing process conditions. Such conditions may be, for example, be the specific heat of different batches of fluids used in the process, such as the different batches of a chemical or different chemicals used in the manufacture of photographic products. Systems having heating means with faster dynamic response than heat exchangers and conventional control systems have been inadequate to provide the precise regulation which is needed by adapting to changing process conditions or compensating on-line and continuously for other changing factors which require a change in the dynamic response of the control system.

Control systems sometimes have both feedforward and feedback control loops; feedforward control being responsive to cancel an incoming disturbance or change while feedback control being responsive to the result of the action which has been taken. Feedback and feedforward controllers have been combined, the feedback controller compensating for any error remaining after the feedforward action. See for example the following patents discussing feedback and feedforward controllers: Harrison, et al., U.S. Pat. No. 3,976,179, Aug. 24, 1976; Koschmann, U.S. Pat. No. 4,290,986, Sep. 22, 1981; Dibiano, U.S. Pat. No. 4,367,354, Jan. 4, 1983; Peterman, et al., U.S. Pat. No. 4,543,245, Sep. 24, 1985 and Dziubakowski, U.S. Pat. No. 4,776,301, Oct. 11, 1988. It has also been suggested to provide adaptive control for tuning of the control law or control function of a controller. See the text "Adaptive Filtering—Prediction and Control" by G. C. Goodwin and K. S. Sin (1984), Prentice Hall - Englewood Cliffs, NJ, USA, especially pages 178-181, for adaptive control concepts.

In known adaptive systems, adaptive control is implemented by perturbing the system (See Paz, U.S. Pat. No. 3,567,395 of Mar. 2, 1971). Then the system response is detected and the system is adjusted or tuned. This approach is inadequate when the effect of these perturbations produces a variation beyond the limits of regulation required. For example, in a system requiring precise regulation of temperature of flowing fluids, particularly chemicals in a photographic film manufacturing process, the perturbation could change the temperature beyond the limits required by the process. Moreover, the approach is difficult to implement: since both the amplitude and frequency content of the perturbing input must affect all response modes of the controlled process which are of interest. Otherwise, the control algorithm adaptation can diverge rather than converge. In other words, the system never reaches a state where the controlled variable is within the desired range, but rather is forced out of control; certainly an undesirable result.

It is a feature of this invention to provide fast dynamic response which lends itself to adaptive control, in the case of a fluid flow temperature control system, using a microwave generator from which microwave energy is derived and applied to rapidly and uniformly heat and increase the temperature of the flowing fluid. Cooling with the microwave generator can be obtained by using an incoming fluid temperature lower than the desired (set point) temperature. Then, the microwave generator continually heats the fluid to desired temperature. Should the temperature of the incoming fluid increase, the output from the microwave generator is decreased, thereby causing less heat to be applied and providing a cooling action. The microwave generator is under feedforward and feedback control so as to precisely regulate the temperature.

Another feature of the invention is to provide control of a variable using feedback and feedforward loops with adaptive control of the feedforward control function from the feedback loop. Specifically, in accordance with the feature, the feedforward controller (if conditions were ideal, which is not the case) would substantially eliminate any deviation of the controlled variable from the desired value. The feedback controller, acting as a backup, then reduces the remaining deviation, and the output from the feedback controller is a measure of the feedforward controller's inability to reduce the remaining deviation (called tuning error) when the system reaches equilibrium. In other words, the feedback output information has, in accordance with the invention been found sufficient to adapt or tune the feedforward controller to match changing process conditions, without having to perturb the controlled variable in order to derive the necessary adaptation or tuning signals. An additional advantage of feedback control of adaptation, in accordance with the invention, is that its implementation is far less complicated than with approaches requiring perturbation of the controlled variable. Since the controlled variable does not have to be perturbed, the system is tuned without driving the variable outside of the limits in which it must be maintained to meet process requirements.

Accordingly, it is the principal object of the invention to provide a process control system which is fast acting and which can regulate a process variable within precise limits with an extremely fast response.

It is a further object of the invention to provide a process control system for temperature regulation of flowing fluids utilizing microwave energy from a microwave generator so as to obtain extremely fast response (e.g. approximately 0.6 seconds to change the energy from zero to 100% or maximum output) and which does not affect the control function of the system by adding additional dynamics (the microwave generator acting essentially as a constant transfer function in the control law of the system).

It is a further object of the present invention to provide an adaptive process control system using a feedforward controller; the control function or law of the system being adapted by a feedback controller, and the feedforward controller alone or together with the feedback controller providing an output for controlling the process variable of interest. The process variable may be temperature of a flowing fluid and a microwave generator which has an extremely fast response is responsive to the output of one or both of the controllers.

It is a still further object of the invention to provide an adaptive process control system having a feedforward and a feedback controller with adaptive control of the feedforward controller in response to the output of the feedback controller, which controllers are implemented in a digital computer.

Briefly described, the invention which may be embodied in a control system for temperature control by the application of microwave energy from a microwave generator which provides heat which changes the controlled variable. The system also includes feedforward and feedback controllers respectively responsive to the variable before and after a control point where the heat is applied from the microwave generator.

Generally, the adaptive regulation of a process variable in accordance with the invention is carried out in a method having the following steps each of which may be performed with a digital computer. The steps are measuring the variable before and after a control point in the process; controlling the variable at the control point in response to changes in the variable as measured before the control point in accordance with a predetermined control function which relates the variable to the conditions of the process; and adapting the control function in response to changes in the variable as measured after the control point and when the changes represent changes in the condition of the process. The condition of the process being represented by changes, for example, when the variable is temperature, when the temperature error, as detected by the feedback controller, has such a low magnitude and slow rate of change as occurs when the process approaches stabilization.

More specifically, the adaptive process control system has a feedforward controller. Suitably, this controller has proportional and derivative responses. In accordance with the preferred embodiment of the invention, only the proportional response is adapted to match changing process conditions. It will be understood that the derivative response or both proportional and derivative responses can be adapted. The system has a feedback controller having proportional and integral responses. The feedforward response may change in one sense, for example, to increase the temperature where the temperature is the controlled variable, while the feedback controller output can change in opposite senses. In other words, the feedforward conroller has a unipolar response whereas the feedback controller has a bipolar response which can add or subtract from that of the feedforward controller. Adaptation is obtained by changing the gain (a constant in the control function) of the feedforward controller in accordance with the feedback output. Preferably, the system operates iteratively, and is implemented with a digital computer having a sampling rate appropriate to accurately detect the fastest rate of change anticipated in the controlled variable. In the present embodiment, a sampling rate of one second may be used. The feedforward gain is adjusted to tune the feedforward controller at steady state conditions when the output rate and magnitude of the variable to which the feedback loop is responsive (the temperature after the control point) is well within limits within which regulation is desired. For example, in a system which regulates temperature within a $\pm 0.5°$ F., the limits may be 0.25° F. in magnitude and 0.025° F. per second in rate of change. Since tuning by adjusting the feedforward gain results in a change in the output from the feedforward controller, a compensating change is made in the output of the feedback controller when steady state conditions are detected. Thus, as the feedforward controller output provides a control signal which changes the controlled variable to its set point value, the output from the feedback controller approachs zero. Should process conditions change, for example a new batch of chemical having slightly different specific heat in an embodiment for temperature control of photographic chemicals, the feedforward tuning will be changed automatically by the feedback controller. No special perturbation of the system is required in order to obtain adaptive control.

The foregoing and other objects, features, and advantages of the invention and the best mode now known for carrying out the invention will become more apparent from a reading of the following description in connection with the accompanying drawings in which:

FIGS. 3A, 3B-1, 3B-2, 3C and 3D constitute a flow diagram illustrating the programming of the digital computer which implements the adaptive process control system shown in FIG. 2.

Figure 1:
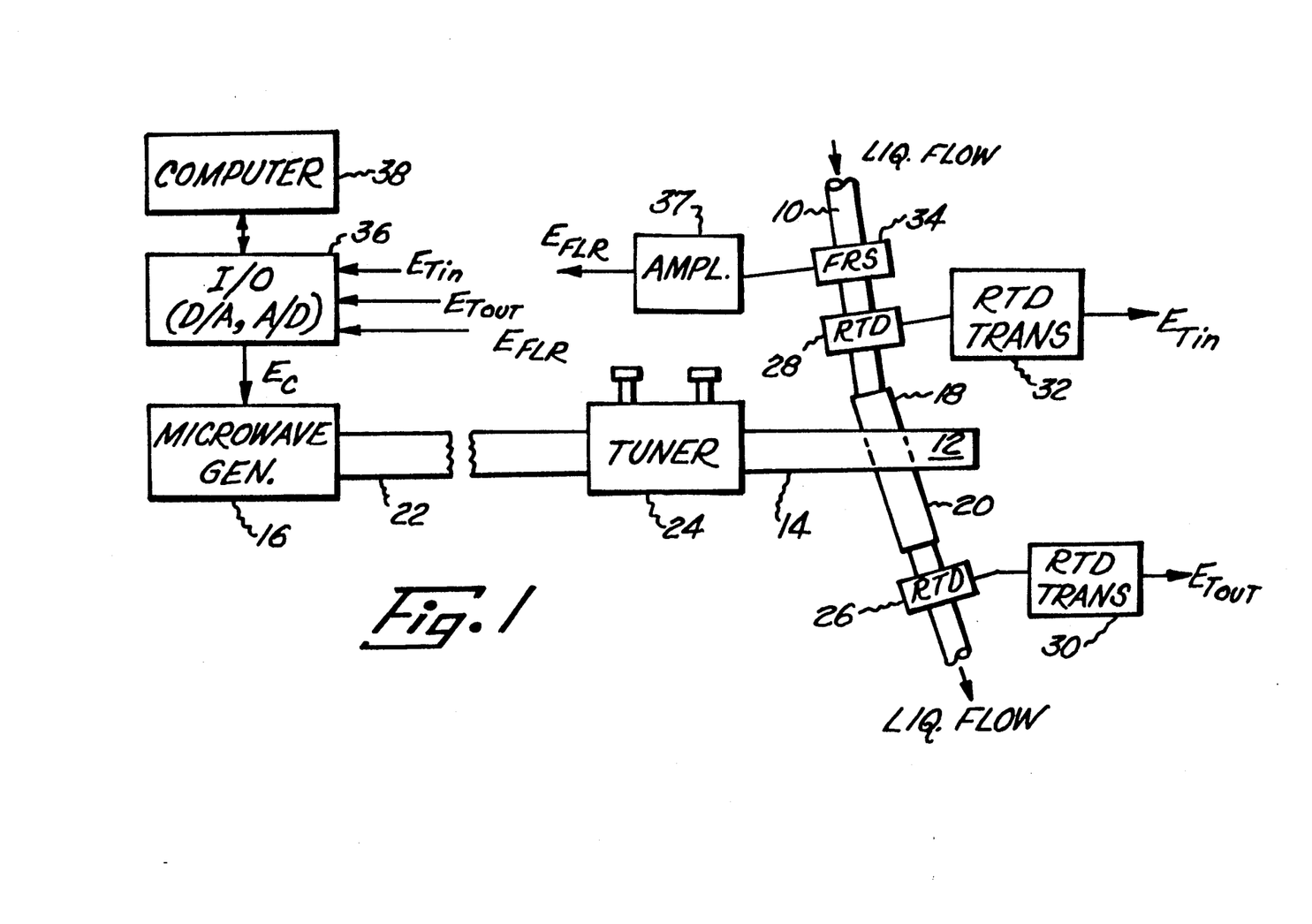
FIG. 1 is a block diagram schematically illustrating an adaptive process control system in accordance with the invention for control of the temperature of a flowing liquid.

Referring to FIG. 1 there is shown apparatus for carrying out a portion of a photographic film manufacturing process. The chemical being dispensed is a fluid (a liquid) which must be regulated precisely in temperature. The chemical is mixed in kettles (not shown) and passes through a system of plumbing including valves and other hardware which are also not shown. The portion of the process shown in FIG. 1 provides the necessary temperature control.

The chemical flows through a plastic pipe 10 past a temperature control point 12 in a wave guide applicator section 14, which applies microwave energy from a microwave generator 16 to heat the chemical at the control point. Conductive couplings 18 and 20 are used to seal the applicator 14 against the escape of microwave energy. The plastic pipe 10 carrying the fluid extends through these couplings.

The applicator 14 is tuned to the frequency of the microwave generator. For example, a suitable generator is made by Gerling Laboratories of Modesto, California, USA and produces an output frequency of 2.45 GHz. Other frequencies may be used, for example, when larger waveguides are practical. The microwaves are transmitted by a wave guide 22 to the applicator 14. The applicator 14 is tuned by a slug tuner 24. Such tuners are shown in U.S. Pat. No. 4,689,459 issued Aug. 25, 1987. The microwave generator is controlled by a control signal (for example, a voltage which may vary from 0 to minus 1 volt) which changes the microwave energy supplied to the applicator 14 from 0 to 3 KW.

The temperature of the incoming fluid is measured ahead of the control point and also after the control point 12 by temperature sensors 26 and 28, which are close, say within one foot, of the control point so that time delay between temperature measurements is minimal and the temperature at the sensor 26 is substantially the same as the temperature of the fluid at the control point. The sensors are suitably resistance temperature devices (RTD) which are responsive to the temperature of the liquid in the pipe. The RTD's form one arm of bridge circuits. These bridge circuits are contained in RTD transmitters 30 and 32. The transmitters also contain amplifiers which produce analog outputs, for example, currents (e.g. from 4 to 20 mA) proportional to the temperature measured by the RTDs 26 and 28. These analog outputs are indicated as $E_{Tin}$ and $E_{Tout}$.

A flow sensor 34 (FRS) is also disposed to sense the flow rate of the liquid through the pipe 10. This flow sensor may be a Micromotion flow sensor. Such sensors have a vibrating loop with pickup coils. The loop vibrates at a frequency of vibration proportional to the rate of flow through the loop. Other sensors may be used such as vane sensors, if practical. The output of the sensor 34 is amplified in an amplifier 37 and produces the flow rate signal, $E_{FLR}$, which may also be a 4 to 20 Ma current signal.

Figure 2:
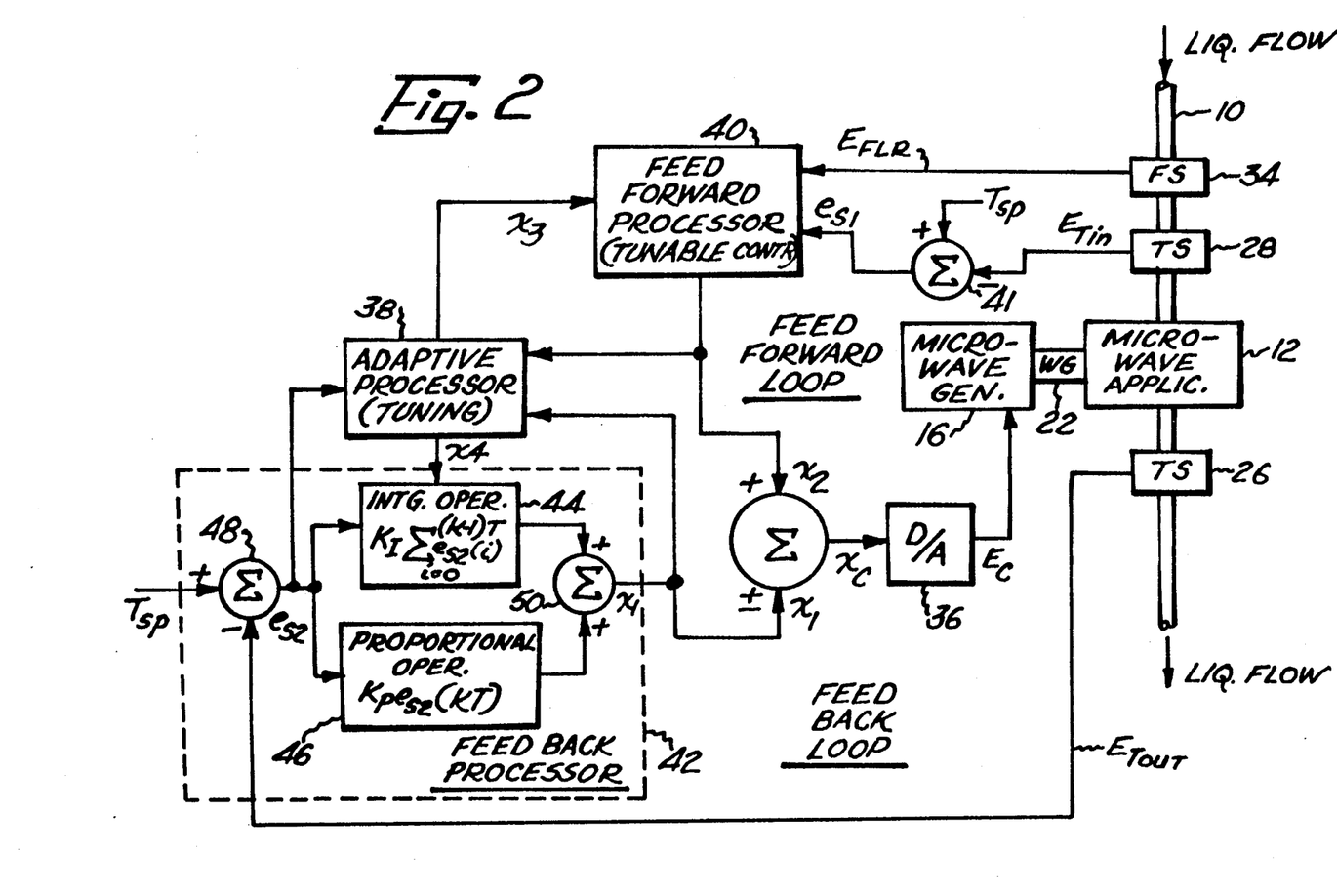
FIG. 2 is a functional block diagram illustrating in greater detail than FIG. 1 the system illustrated therein.
Figure 3A:
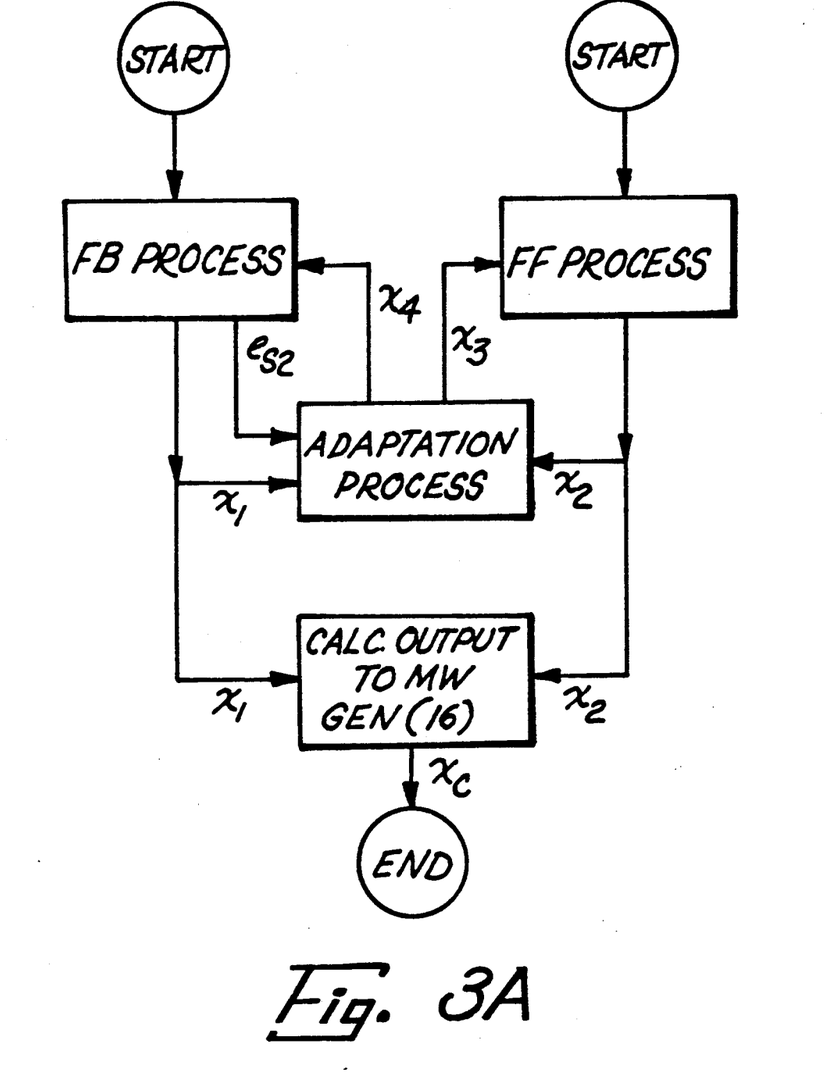

The signals $E_{Tin}$, $E_{Tout}$ and $E_{FLR}$ are applied to an input output (I/O) device 36, including analog to digital converters which digitize these signals, iteratively at a sampling rate, which may be at one second intervals. The digital signals are applied by the I/O 36 to a digital computer 38 which implements the control system which is schematically illustrated in FIG. 2. The computer communicates through the I/O 36 with the microwave generator and provides the control signal $E_c$. This control signal is an analog signal, which as indicated above may vary between 0 and minus 1 volt. The microwave generator has suitable amplifiers which use this control signal $E_c$ to control a magnetron therein which produces the microwave energy. A digital to analog converter in the I/O 36 provides the analog control signal $E_c$ to the microwave generator 16. The I/O 36 includes memory (e.g., latches and other digital logic) for holding the digitized output signals, $E_{Tout}$ between sampling times. The computer 38 which implements the control system is preferably of the type suitable for real time multi-tasking operation (e.g., the Digital Equipment Company - PRO/380 or similar process control computer). This computer is programmed to carry out the processes or algorithms needed to perform feedback control, feedforward control, and adaptation processes which are shown in the flow charts (FIGS. 3A, B-1, B-2, C and D hereof).

The term process is used herein with reference to the flowing fluid temperature control process. The term process also refers to computational processes as will be apparent from the context of the description as it proceeds. The microwave generator has a constant transfer function and can vary its output energy over a multikilowatt range. Absorption of the microwave energy by the bulk of the fluid is very rapid so that fast temperature transients can readily be followed and corrected by the energy supplied from the microwave generator.

FIG. 2 illustrates the controller. This controller provides feedforward control in response to the temperature measured ahead (upstream) of the control point 12 by the sensor 28. The system provides feedback control in response to the temperature measured by the sensor 26 after (downstream) the control point. In other words, there is a feedforward controller or control loop and a feedback controller or control loop. An adaptive processor 38 exercises control over a feedforward processor 40 in the feedforward loop. The adaptive processor 38 derives control signals from the feedback loop. The system is designed to control the temperature at the control point to a certain set point temperature $T_{SP}$. The set point is adjustable by an input to the computer 38 from a keyboard. Operating constants of the control functions in the loops can be entered into the computer from the keyboard. The I/O 36, A/D may provide a 12 bit conversion for high accuracy and precise control.

The feedback loop utilizes a feedback processor 42 which has an integral and proportional response which is illustrated as the summation operator 44 and the proportional operator 46 thereof (an integral function). The set point signal $T_{SP}$ is compared or summed as shown at 48 with the temperature signal $E_{t\ out}$ from sensor 26 to provide an error signal ($e_{s2}$). This signal, $e_{s2}$, is subjected to the proportional operator 46 and the integral operator 44 and summed at 50 to provide the feedback processor output $x_1$. $x_1$ can be positive or negative and respectively either adds to or subtracts from the output of the feedforward loop to control the amount of energy produced by the microwave generator 16, which is applied via the wave guide 22 to the microwave applicator 12 at the control point. The summation operator 44 is also affected by the adaptive processor 38 which provides a signal $x_4$ to vary the integral value produced by the summation operator 44. The response of the feedback controller may be written as $$x_1(kT) = K_p e_{S2}(kT) + K_1 T \sum_{i=0}^{k-1} e_{S2}(iT) + Kx_2(kT) \qquad (1)$$

where T is the sampling interval (1 sec in this example), k denotes the kth sample and the other terms are defined above and $K_p$, $K_I$ and K are tuning constants, discussed below.

The feedforward processor has a proportional response in accordance with the control function of the process. The feedforward processor may also have a derivative response. This response is to the error signal $e_{s1}$ obtained from the summation of the signal from the temperature sensor 28, $E_{Tin}$ and $T_{sp}$ at 41. The proportional response alone is used in this illustrative embodiment of the invention. This response may be expressed as follows:

$$KW_{out} = a\left[\frac{C_p W \Delta T}{K_m}\right] \qquad (2)$$

where a is the adaption gain of the control function, $C_p$ is the specific heat of the fluid in the pipe 10 in BTUs per pound per °F.; W is the flow rate of the fluid in pounds per minute, ΔT is the temperature correction needed to bring the temperature at the control point 12 to the set point in degrees Farenheit; and $K_m$ is a constant which has a value of 57 when the above units are used.

The derivative response, if used, will be equal to $$K_d \left[ \frac{e_{S1}(kT) \cdot e_{S1}(\bar{k} \cdot 1T)}{T} \right] \quad (3)$$

where $k_d$ is the derivative response gain.

The output of the feedforward controller $x_2$ is a fractional value proportional to the desired output power from the microwave generator. The above equation for KW can be used to calculate the necessary output from the feedforward processor 40. In practice, the relationship between generator input and output may be nonlinear. Therefore, the best temperature control will be achieved when this nonlinearity is taken into account in determining $x_2$. In other words, the system compensates for nonlinearity in the microwave generator. The output from the feedback controller 42, $x_1$, may add to or subtract from the feedforward controller output $x_2$. $x_1$ and $x_2$ are summed at 52 to provide a control output $x_c$. This control output is converted from a digital signal into the analog signal $E_c$ in the digital analog converter D/A of the I/O 36. Only the D/A of the I/O 36 is shown in FIG. 2. The analog output $E_c$ may vary from 0 to −1 volts (or other range depending upon the interface of the microwave generator) and controls the power generated by the microwave generator 16 so as to accurately and precisely regulate the temperature at the control point. The feedforward loop is responsible for changing the temperature at the control point by varying the amount of energy produced by the microwave generator 16. The system operates during transient changes and also adapts to changes in the process. For example, different batches of liquid may have different specific heats. Then the initial control function is incorrect. This control function is adapted or tuned by changing the adaptation gain a. The adaptation gain will also change to correct for other conditions such as a change in the frequency of the output of the microwave generator which may change the amount of energy transmitted to the fluid, which ultimately changes the controlled temperature. The microwave generator has negligible dynamics and responds substantially as a constant gain device.

Changes in conditions of the process which affect the temperature variable are detected by the $e_{s2}$ input from the feedback processor 42 to the adaptive processor 38. The criteria for adaptation to begin is when the rate of change of $e_{s2}$ and the magnitude of $e_{s2}$ reach a predetermined small value. This value may be a fraction, say ½ of the magnitude of the temperature control range of the system and 10% of such magnitude in terms of rate of change. For example, for a control range of ±½° F. the signal $e_{s2}$ representing the state of the system where process conditions are manifest, steady state condition, may be about 0.25° F. in magnitude. The rate of change of $e_{s2}$ may be approximately 0.025° F. per second. When these values are detected in the adaptive processor 38, the process is sufficiently close to steady state and the adaptation processor 38 outputs its control signal $x_3$. $x_3$ is derived in response to $x_2$ by multiplying $x_2$ by a value which depends upon the rate at which the control function is to be changed. In order to change the control function smoothly without hunting, it is desirable that the factor which $x_2$ is multiplied by, be less than 1. A suitable value is 0.1. $x_3$ then generates the new value of the tuning constant a in the control function which is used in the feedforward processor 40. Then changes in process conditions, such as a change in $C_p$, which affects the tuning constant are manifest and the tuning constant can be adapted. No perturbation of the system (no artificial changes in temperature) is necessary to adjust the tuning constant or to otherwise adapt the system for changes in process conditions. Accordingly, precise control which adapts for changes in process conditions or initial mistuning (or other faults) while exercising a fast dynamic response to transients in the parameter (the temperature) being controlled is maintained.

Any remaining error in the temperature (after the control point) is detected by the sensor 26 and further corrections are effected by the feedback processor 42. The combined output from both processors 40 & 42 makes up the input $x_C$ to the microwave generator 16. During the adaptation process the output $x_2$ from the feedforward processor 40 changes in response to adjustments in "a" (the tuning constant). However, it is essential that the combined input $x_C$ remain constant so, for example, increases in $x_2$ have to be accompanied by equal magnitude decreases in $x_1$ etc. At the near steady state condition where adaptation is active, the output from the feedback controller $X_1$ is due almost entirely to the integral response 44. Accordingly, the adaptive processor corrects the integral output from the integral operator 44 based upon the change in the feedforward output $x_2$ by applying the signal $x_4$ to the integral operator 44, thereby returning the loops to their balanced condition. $x_4$ is given by the last term in the feedback controller response equation (1) where a suitable value for K is 0.1. The adaptation process continues on each iteration until the output from the feedback controller $x_1$ reduced to zero indicating near perfect feedforward controller tuning.

Referring to the flow charts and particularly to FIG. 3A, it will be seen that the flow charts have start and end points. The start points are the beginning of each scan or iteration. The end points means that an output value is available, for example, the feedback loop output $x_1$, the feedforward output $x_2$ or the adaptive processor outputs $x_3$ and $x_4$. FIG. 3A shows the overall program which consists of the feedback process (FB process) and the feedforward process (FF process). The program also has an adaptation process which principally generates the tuning constant $x_3$. The program also has a process for calculating the output to the microwave generator 16 which produces $x_c$. As discussed in connection with FIG. 2, $x_c$ is a fractional value, proportional to the maximum output from the microwave generator, and is converted into an analog signal $E_c$ for controlling the generator 16 by the D/A 36.

Figure 3B:
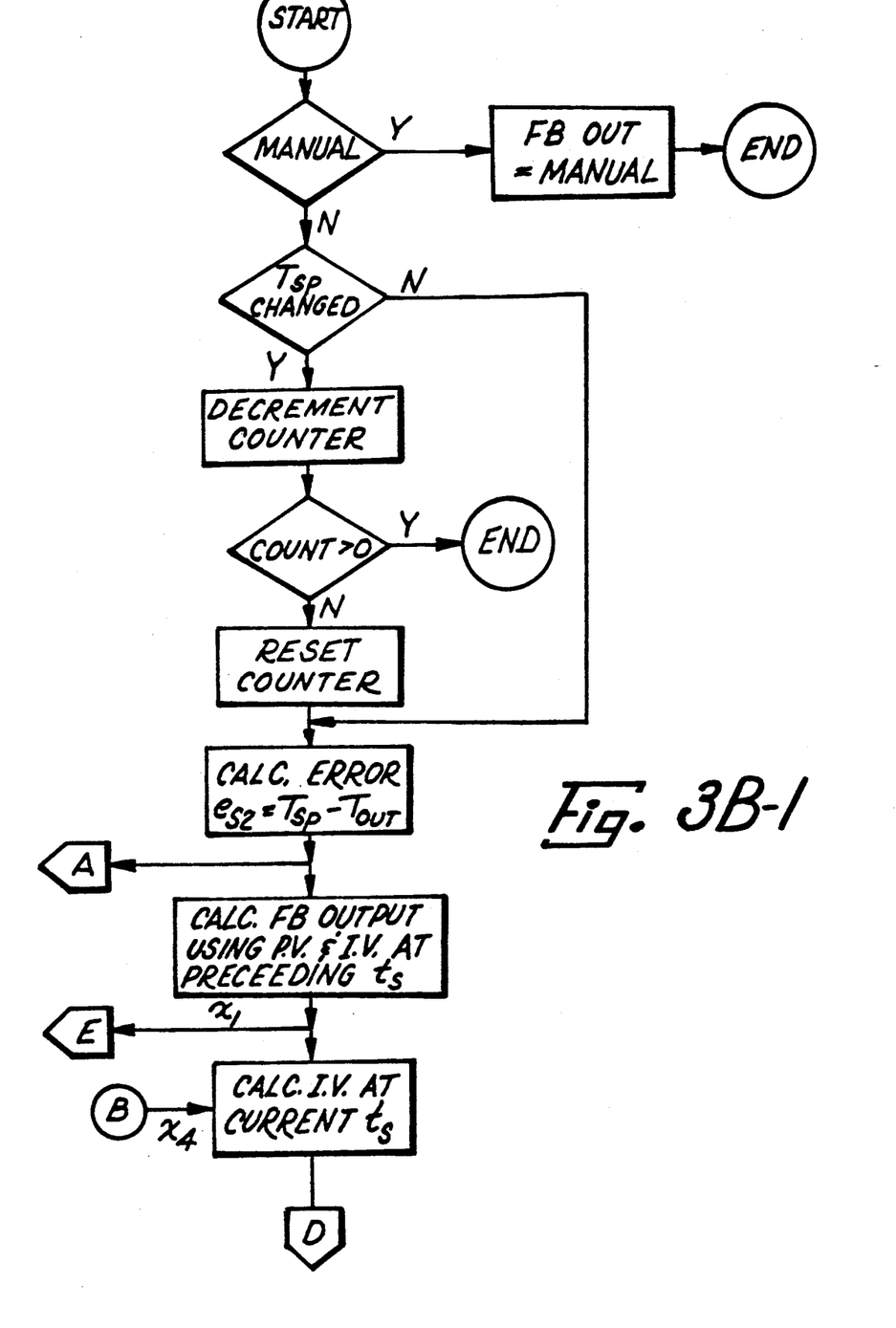
Figure 3B:
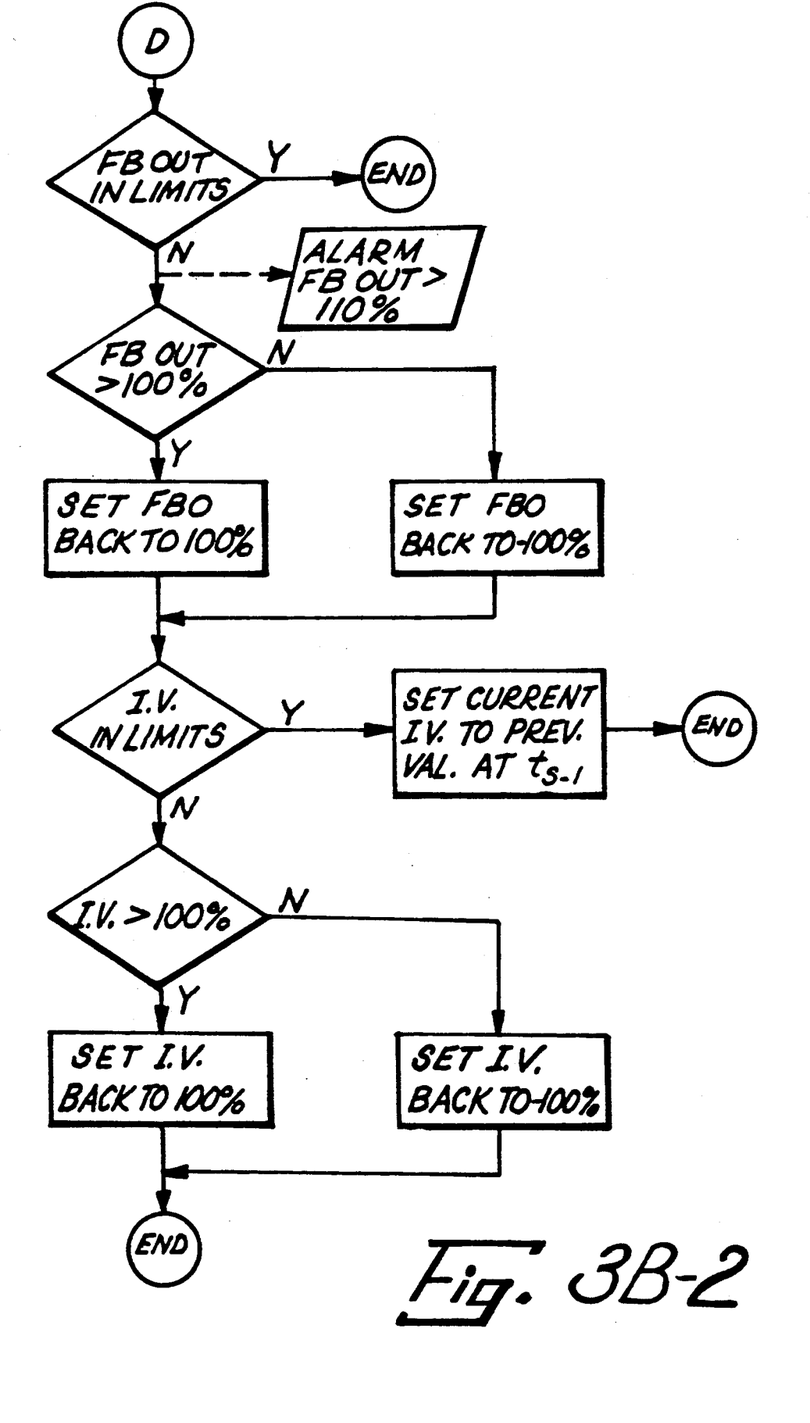

FIGS. 3B-1 and 3B-2 represent the feedback process. The program proceeds by determining whether a flag indicating that the system is set for manual rather than automatic operation. If the system is set for manual operation, the feedback output $x_1$ is taken from the value which is set at an output location in memory (RAM) of the computer 38. As noted above, the end symbol means the end of the process, that is, that the output is ready.

If the system is set for automatic operation, the determination is first made as to whether the set point has changed. Set point changes are entered into the computer into a location in memory from a keyboard. The feedback and feedforward processes detect a change in setpoint simultaneously. Under normal circumstances, the feedforward process supplies all the necessary control. Due to the exponential response of the RTD 26 and associated transmitter 30 (FIG. 1), the new value of process temperature is delayed in being transmitted to summing junction 48 (FIG. 2). Consequently, if the response of the feedback process was instantaneous, the temperature would then be overcorrected. Therefore, it is desirable to insert a delay in the response of the feedback process so that it does not respond immediately to a set point change. The delay is provided by a counter. Each sample time (e.g. 1 second intervals) the counter is decremented until the count is reduced to 0. Then the counter is reset to await the next delay cycle and the calculation of the feedback output proceeds. Of course, if there has been no set point change, the program jumps to the next calculation as shown on the flow chart.

The next process is the calculation of the error signal $e_{s2}$. This signal is used in the adaptation process shown in FIG. 3D as shown by the off-page connectors A—A. It will be appreciated that the I/O 36 is programmed to sample the sensors and input new values into memory at each iteration (at the start of each scan). The calculation of the feedback output depends upon the tuning constants $K_p$ and $K_I$. These constants are determined by the operator and stored in memory. They indicate the fractional part of the error signal $e_{s2}$ used for the proportional and the integral responses, respectively. The value of $K_p$ and $K_I$ are selected in accordance with the magnitude and rate of correction desired from the system. Similar adjustment technique for proportional and integral responses in control systems are described in classical papers in the field of control systems.

The process calculates the feedback output $x_1$ using the proportional value (from the proportional operator 46) and the integral value (from the integral operator 44). However, the integral value (I.V.) at the preceding sample time is used (at $t=(k-1)T$) as indicated by the equation for $x_1(kT)$ given above. This is because the integral is the area under the $e_{s2}$ vs. time curve and a delay of 1 sample time is needed until the integral is obtained. Accordingly, the I.V. up to the previous sample time is used. Then for use in the next calculation the integral value at the current sample time ($t=kT$) is obtained. The feedback process proceeds via the connectors D—D to FIG. 3B-2.

FIG. 3B-2 is a process which detects and compensates for what is known as "reset wind-up" by which is meant that the controller has reached 100% output and cannot make further corrections. In this system this means that the microwave generator has reached either 100% output (3 kilowatts) or is at 0% output. However, error signal $e_{s2}$ may still exist for a period of time and could cause the integral value to increase to a large number which can only be reduced by having an error of opposite polarity existing generally for long periods of time. In this situation, the process is out of control. This mode of operation can be prevented as shown in FIG. 3B-2 by limiting the controller output and particularly the integral value to the value it has at the time the controller output reaches ±100%. Should the integral value attempt to exceed ±100%, it is set back to the corresponding maximum value. Accordingly, the system must use integral values at 0 or 100% of the controller output until the integral value decreases and control is returned to the system.

The reset wind-up control program, set forth in detail in FIG. 3B-2, makes sure that the feedback output (FBO) and the integral value (I.V.) are set back either to +100% or −100% when the feedback output is out of limits. The program proceeds by checking the feedback output to determine whether it is in or out of limits. If the feedback output $x_1$ is in limits, then it is used. If the feedback output is well out of limits, say 110%, an alarm may be sounded or other indicator of well out of range condition produced. If the feedback output is more than 100%, it is set back to 100%. Of course, if the feedback output indicates that it is not more than 100% but is out of limits, it is then set back to −100%. A similar procedure is used for setting the integral value back to 100% or −100%. The feedback output may be greater than 100% because of changes in the integral value alone. However, the out-of-limits condition can be due to the proportional value (P.V.). The maximum integral value is used (I.V.=100%). An integral value which may also be used may be less than the maximum value to accommodate for a contribution from the proportional value. If the integral value is in limits but the feedback output is out of limits, then the current integral value which is used in determining the feedback output is set to its value at the previous sampling ($t_{s-1}$).

Figure 3C:
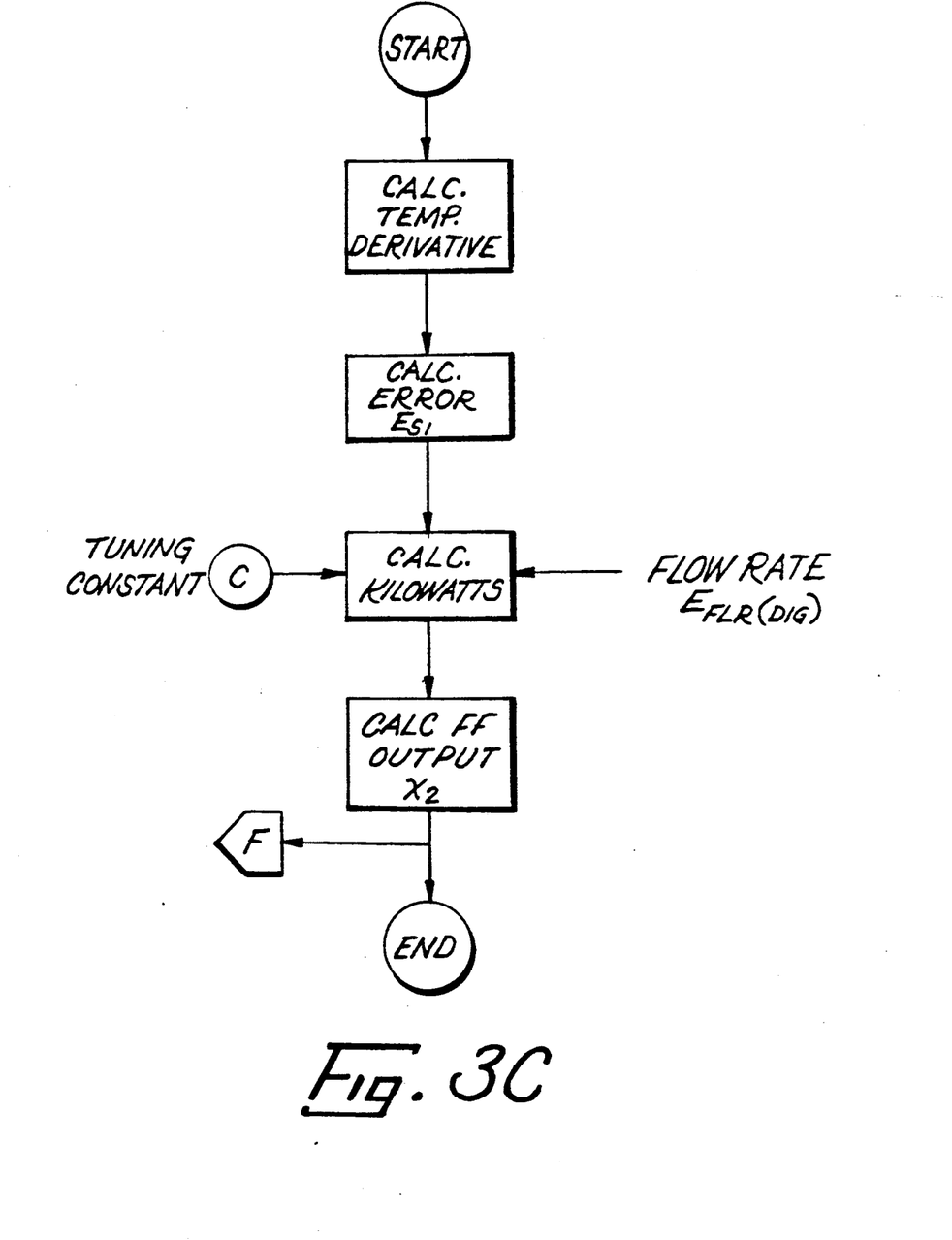

FIG. 3C shows the feedforward process. The feedforward process calculates the output signal $x_2$ according to the KW equation previously given and also includes a component in $x_2$ which is proportional to the rate of change of incoming temperature. Signal $x_2$ is also adjusted to compensate for any nonlinearity which may exist in the generator input-output characteristic as discussed above. When such compensation is used, it can be provided by approximating the $E_{Tout} = f(E_c)$ curve by any suitable approximation technique. A simple example is a straight line segment approximation. The feedforward process is designed to calculate the $x_2$ output in response to $E_{FLR}$, the digital value of which is obtained from the I/O 36 (FIG. 1). The tuning constant "a" is also entered. This tuning constant comes from the adaptation process (see FIG. 3A). The feedforward process calculates the derivative of the temperature measured ahead of the control point 12. This is the difference in temperature as measured at successive sampling times divided by the interval between sampling times (1 second in this embodiment). The $e_{sI}$ signal may be used to calculate the temperature derivative. The $e_{sI}$ signal is calculated from the set point and $E_{Tin}$ signal as shown at the summation point 41 in FIG. 2. The program then proceeds to calculate the kilowatts of microwave energy necessary to change the temperature to the set point temperature. This is a multiplication program which implements the formula for kilowatts given above. The kilowatt output is converted into a percentage of maximum power (3 kilowatts) to calculate the feedforward output $x_2$. In other words, the kilowatt output is converted into a digital number representing a value from 0 to 100% where 100% corresponds to 3 kilowatts.

Figure 3D:
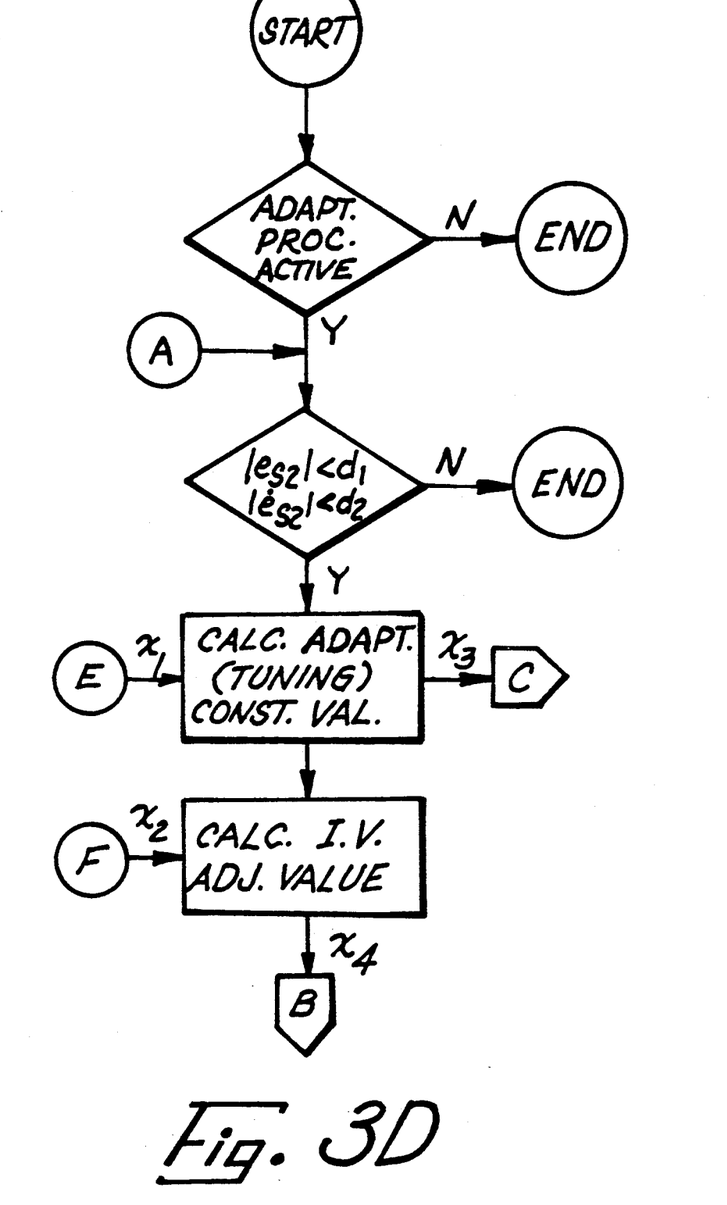

FIG. 3D, shows the adaptation process. The operator may, by keyboard control, render the adaptation process active or inactive. If the process is inactive, the program uses the values determined without adaptation (viz. $x_1$, $x_2$, and $x_c$). If the adaptation process is active, the absolute value of the magnitude of $e_{s2}$ and the absolute value of the rate of change of $e_{s2}$, which is illustrated in FIG. 3D by a dot over the $e_{s2}$ symbol, are checked to determine if they are within limits, $d_1$ and $d_2$. $d_1$ and $d_2$ are empirically derived. They may be selected in accordance with the criteria noted above and changed empirically when calibrating or trimming the control system on start-up of the process. If the system is not in steady state and there are large changes in $e_{s2}$ or the rate of change of $e_{s2}$, then adaptation is not used during this sample time. However, if the values of $e_{s2}$ and its rate of change are within limits, the adaptation or tuning constant value is calculated. The updated value of the tuning constant is calculated using the following equation:

$$a_i = a_{i-1}[1 + 0.1(x_1/x_2)] \qquad (4)$$

where a, $x_1$, and $x_2$ have been previously defined.

The adaptation program also calculates the integral value adjustment $x_4$ by multiplying $x_2$ by a constant. As noted above, the tuning value and the adjustment in the integral value are obtained only during steady state conditions, when changes in process conditions and manifested, rather than during dynamic or transient changes which are corrected by the operation of the feedforward and sometimes the feedback loop. Since the control system is adaptive, it maintains control over the process parameter of interest (temperature) notwithstanding changes in process conditions, such as a change in the specific heat of the fluid used in the process and without the need for perturbing the system.

From the foregoing description, it will be apparent that there has been provided an improved adaptive process control system. The system has been described in connection with the control of a specific variable, namely temperature. It will be appreciated that the invention may be used to control other variables and the control device may then be of some other type than the herein illustrated microwave generator. For example, valves may be used as control devices, to add hotter or cooler liquid or different reagents to a process. Microwave energy has been found especially advantageous to provide rapid and precise temperature control of a flowing fluid. Other variations and modifications within the scope of the invention will undoubtedly suggest themselves to those skilled in the art. Accordingly, the foregoing description should be taken as illustrative and not in a limiting sense.

What is claimed is:

1. The method of regulating a process variable which comprises the steps of measuring the variable to be regulated before and after a control point in the process, controlling said variable at the control point in response to changes in said variable as measured before the control point in accordance with a pre-determined control function which relates said variable to at least one condition of the process, and adapting the control function in response to changes in said variable as measured after the said control point only when the magnitude of the changes of said variable as measured after said control point and the rate of change thereof being less than predetermined values.

2. The method according to claim 1 further comprising controlling separate from said control function, said variable at said control point in response to changes in said variable as measured after said control point.

3. The method according to claim 2 further comprising the step of changing the response to changes in said variable measured after said control point to compensate for the adapting of said control function.

4. The method according to claims 1, 2 or 3 wherein said changes in said variable are with respect to a set point for said variable.

5. The method according to claims 1, 2 or 3 wherein said step of controlling the variable in response to changes as measured before the control point is carried out with the aid of a feedforward control loop extending between the point where said variable is measured before said control point and said control point, and said step of adapting said control function is carried out with the aid of a feedback control loop connected to the point where said variable is measured after said control point.

6. The method according to claim 5 wherein said step of controlling said variable in response to changes as measured before said control point is carried out with the aid of a feedforward control loop extending between the point where said variable is measured before said control point and said control point, said step of adapting said control function is carried out with the aid of a feedback control loop connected to the point where said variable is measured after said control point, and said controlling step is carried out with said control function controlling the response of said feedforward loop, said feedforward loop response being at least a proportional response, and said adapting step is carried out with another control function having a proportional and integral response in said feedback loop.

7. The method according to claim 6 wherein said control function in said feedforward loop also has a derivative response.

8. The method according to claim 1 wherein said controlling and adapting steps are carried out iteratively after successive intervals of time.

9. The method according to claim 8 wherein said iterative controlling and adapting steps are carried with the aid of a digital computer to provide a control output, and with a control device operated by said output for regulating said variable at said control point.

10. The method according to claims 1, 2, 3, 8, 6, 7 or 9 wherein said process comprises the flow of a fluid and said variable is the temperature of said fluid, and further comprising measuring the flow rate of said fluid before said control point, and wherein said control function is responsive to said flow rate, and said controlling step is also carried out in response to said flow rate.

11. The method according to claims 1, 2, 3, 8, 6, 7, 9 or wherein said process comprises said variable is the temperature thereof, and further comprising the step of applying microwave energy at said control point, and said controlling step is carried out by controlling the magnitude of said microwave energy which is applied at said control point to regulate the temperature of said fluid rapidly and precisely.

12. Apparatus for regulating a process variable which comprises means for measuring the variable to be regulated before and after a control point in the process, means for controlling said variable at the control point in response to changes in said variable as measured before the control point in accordance with a predetermined control function which relates said variable to at least one condition of the process, and means for adapting the control function in response to changes in said variable as measured after said control point only when the magnitude of said changes of said variable as measured after said control point and the rate of said change thereof are less than predetermined values.

13. The apparatus according to claim 12, further comprising means for controlling separate from said control function, said variable at said control point in response to changes in said variable as measured after said control point.

14. The apparatus according to claim 13 further comprising means for changing the response of said adapting means for changes in said variable measured after said control point to compensate for the adapting of said control function.

15. The apparatus according to claims 12, 13 or 14 wherein said means which are responsive to changes in said variable are responsive to changes thereof with respect to a set point for said variable.

16. The apparatus according to claims 12, 13 or 14 wherein said means for controlling the variable in response to changes as measured before the control point is feedforward control means extending between the point where said variable is measured before said control point and said control point, and said means for adapting said control function is feedback control means connected to the point where said variable is measured after said control point.

17. The apparatus according to claim 12 wherein said means for controlling the variable in response to changes as measured before the control point is feedforward control means extending between the point where said variable is measured before said control point and said control point, said means for adapting said control function is feedback control means connected to the point where said variable is measured after said control point, and said feedforward and feedback control means include means operative iteratively at successive intervals of time.

18. The apparatus according to claim 17 further comprising a programmed digital computer providing said feedforward and feedback control means, said computer providing a control output, and a control device operated by said output for regulating said variable at said control point.

19. The apparatus according to claim 12 wherein said means for controlling the variable in response to changes as measured before the control point is feedforward control means extending between the point where said variable is measured before said control point and said control point, said means for adapting said control function is feedback control means connected to the point where said variable is measured after said control point, and said adapting means includes means for controlling the response of said feedforward means, such feedforward means response being at least a proportional response and said feedback control means having a proportional and integral response.

20. The apparatus according to claim 19 wherein said feedforward control means also has a derivative response.

21. The apparatus according to claim 12 wherein said process comprises the flow of a fluid and said variable is the temperature of said fluid, and further comprising means for measuring the flow rate of said fluid before said control point, and wherein said control function is responsive to said flow rate, and said controlling said means is operative for controlling temperature and is also responsive to said flow rate.

22. The apparatus according to claim 21 wherein said process comprises the flow cf a fluid and said variable is the temperature thereof, and further comprising means for applying microwave energy to said fluid at said control point, and said controlling means is operative for controlling the magnitude of said microwave energy which is applied at said control point to regulate the temperature of said fluid rapidly and precisely.

23. A system for controlling the temperature of a flowing fluid which comprises means including a microwave generator for providing variable output energy, means for applying said energy to said fluid at a control point, feedforward controller means responsive to the temperature of said fluid upstream of said control point for providing an output in accordance with a first control function which is adaptable for controlling said microwave generator, feedback controller means separate from said feedforward controller means and operative in accordance with a second control function having at output responsive to the temperature of said fluid downstream of said control point for adapting said first control function, and means for controlling said microwave generator responsive to both said feedback and feedforward controller means.

24. The system according to claim 23 wherein sensors are located in thermal communication with said fluid within distances from said control point such that the temperature of said fluid is about the same at said sensors as at said control point, one of said sensors being downstream of said control point and coupled to said feedback controller and another of said sensors being upstream of said control point and coupled to said feedforward controller.

25. The system according to claim 23 wherein said first control function has at least one gain response term and further comprising means for varying said gain response term of said first control function in response to the output of said feedback controller when said output approaches steady state condition.

26. The system according to claim 25 further comprising means for reducing the output of said feedback controller to compensate for the variation in the gain of said feedforward controller at said steady state condition.

* * * * *